E. W. MARVEL.
CHANGEABLE COMBINATION KEY LOCK.
APPLICATION FILED JAN. 7, 1920.
1,374,310.
Patented Apr. 12, 1921.
4 SHEETS—SHEET 1.
FIG. I.
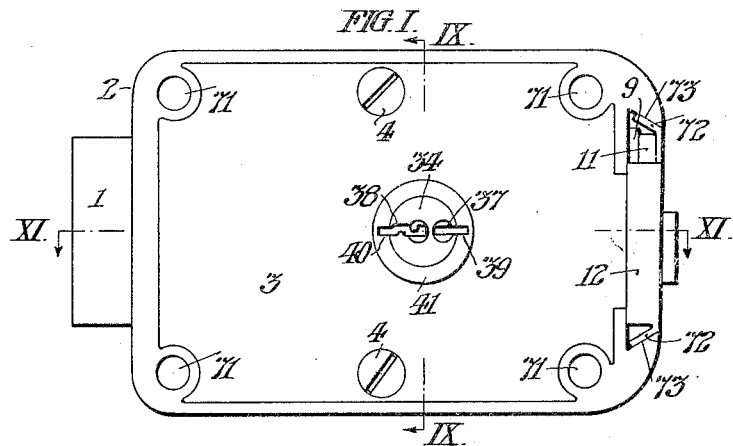
FIG. II.
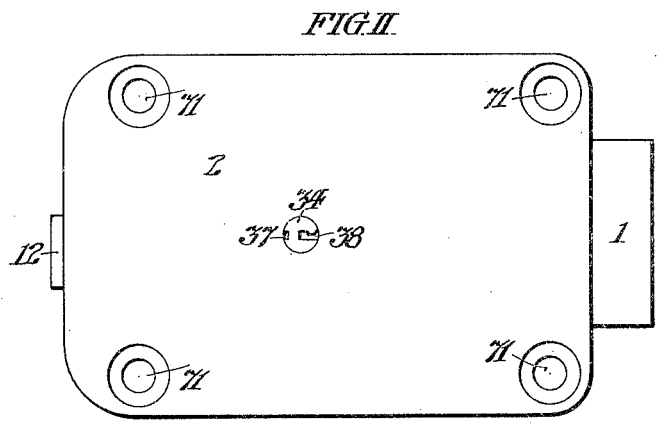
FIG. III.
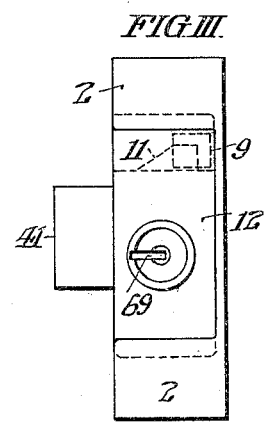
Inventor
Edward Willey Marvel,
By Arthur E. Paige,
Attorney

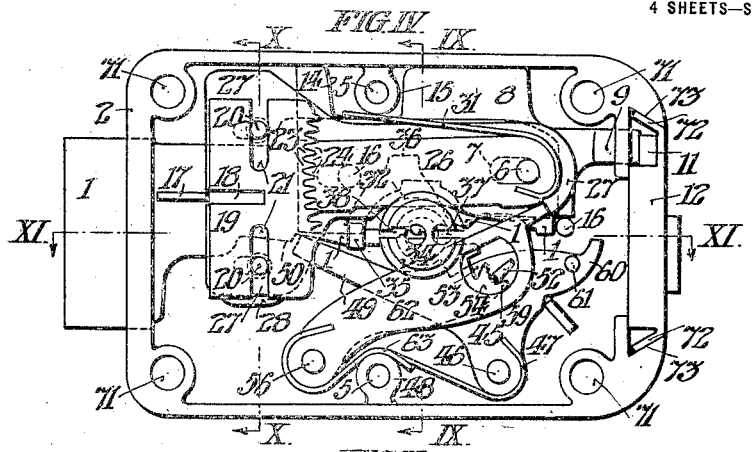
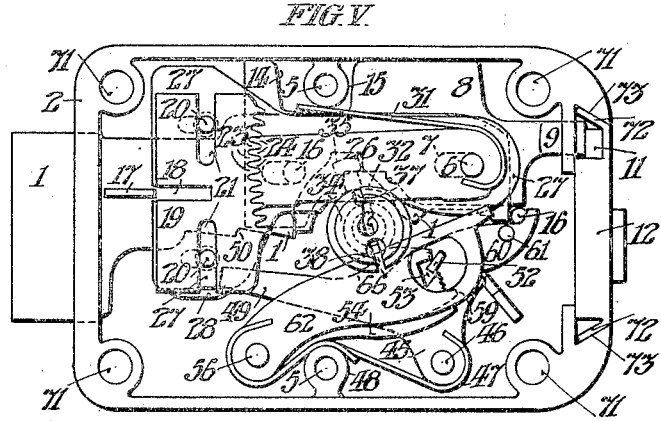
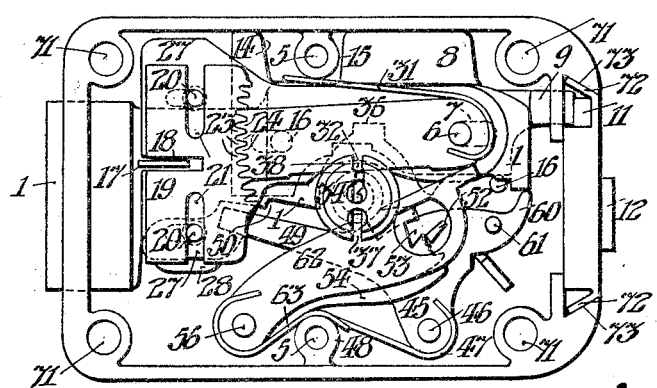

E. W. MARVEL.
CHANGEABLE COMBINATION KEY LOCK.
APPLICATION FILED JAN. 7, 1920.
1,374,310.
Patented Apr. 12, 1921.
4 SHEETS—SHEET 3.
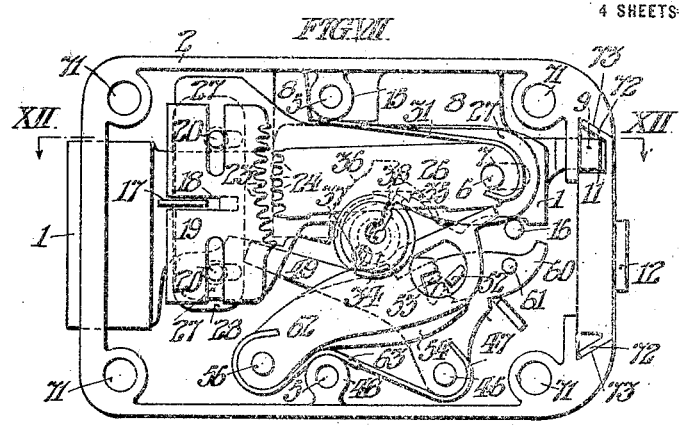
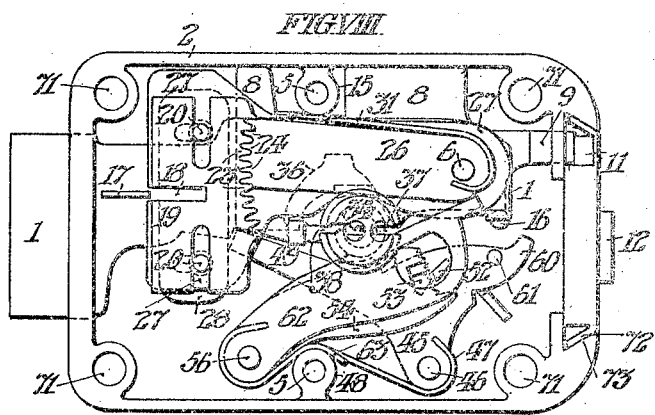
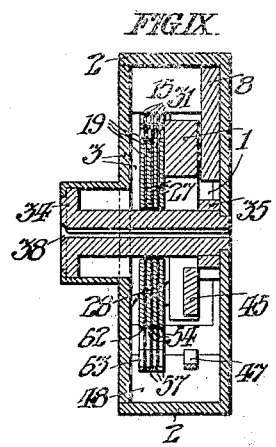
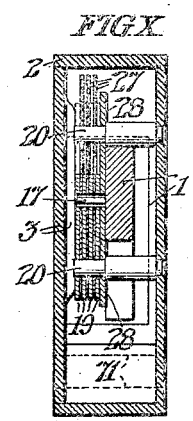

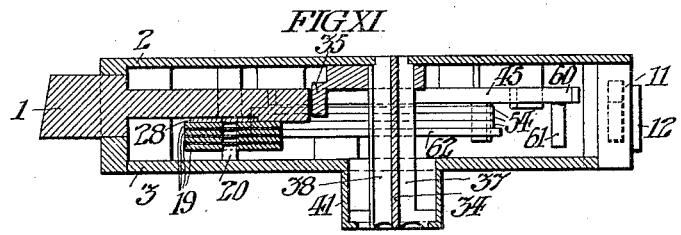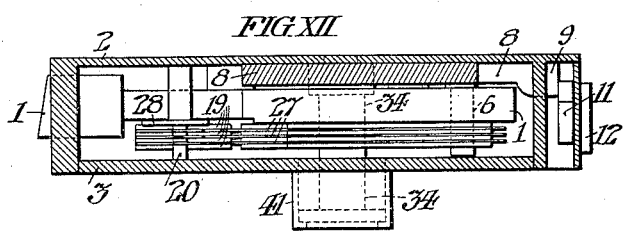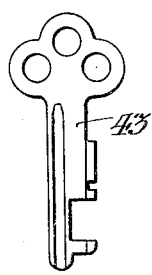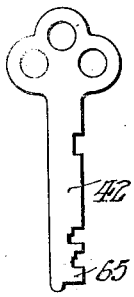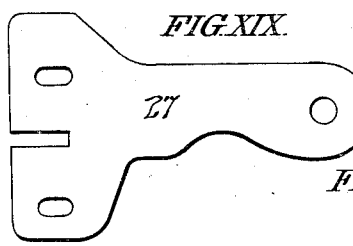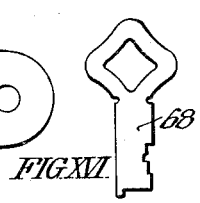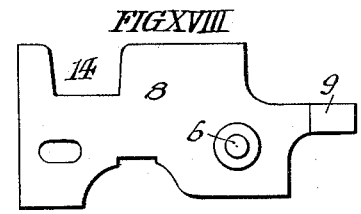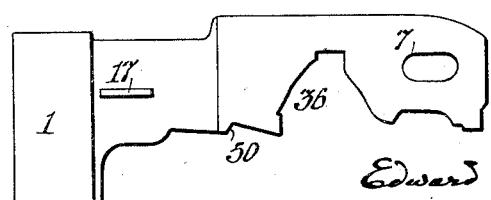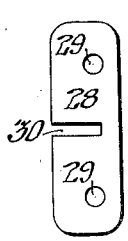

UNITED STATES PATENT OFFICE.

EDWARD WILLEY MARVEL, OF PHILADELPHIA, PENNSYLVANIA.

CHANGEABLE-COMBINATION KEY-LOCK.

1,374,310.    Specification of Letters Patent.    Patented Apr. 12, 1921.

Application filed January 7, 1920. Serial No. 349,939.

*To all whom it may concern:*

Be it known that I, EDWARD WILLEY MARVEL, a citizen of the United States, residing at Philadelphia, in the county of Philadelphia and State of Pennsylvania, have invented a certain new and useful Improvement in Changeable Combination Key-Locks, whereof the following is a specification, reference being had to the accompanying drawings.

My invention relates to locks adapted for use in connection with safety deposit boxes and similar inclosures and of the general character described in Letters Patent of the United States 1,166,380 and 1,166,381 granted to me December 28, 1915, to wit, locks normally requiring the use of both a guard key and a main key to effect each opening movement of the lock.

Safety deposit boxes being successively leased to different parties to whom the lessor furnishes a main key adapted to open a given box when the lock thereof is partially operated by a guard key in the possession of the lessor; the lessees sometimes fail to return the main keys at the expiration of their leases and it is necessary to change the locks before again leasing them, in order to render the boxes secure against unauthorized use. Moreover, even if the lessees return the main keys at the expiration of their leases, it is desirable to change the locks whenever the lessees of the boxes are changed, to prevent the otherwise possible use of unauthorized duplicates of the keys which have been returned.

My present invention renders such a lock changeable as to the combinations of its tumblers, so that it may be adjustably set to be opened by different main keys. In the latter respect, my present invention is of the general character described in Letters Patent of the United States 1,145,870 granted to me July 6, 1915. However, my present invention differs from that disclosed in the last named Letters Patent, not only in the specific construction and arrangement of the mechanism of the main lock, but in the provision of an auxiliary key lock, in such correlation with the main lock, that it is necessary to unlock the auxiliary lock to permit the combination of the main lock to be changed.

Therefore, my present invention is advantageous in providing a lock of the character described with means whereby the combination controlled by the main key may be readily changed without removing the lock, or otherwise disturbing its mechanism, and while it remains subject to operation by the same guard key.

As hereinafter described, my invention includes a series of counterpart pivoted main tumblers, subject to operation by main keys, each of said tumblers having a sectoral series of gear teeth at its free end, and being independently adjustable to different positions of arcual engagement with respect to a reciprocatory fence having a sectoral series of gear teeth arranged to mesh with the gear teeth on said tumbler; said fences having means continuously maintaining them in operative position, but said main tumblers being adapted to be simultaneously disengaged from their respective fences by abnormal retraction of the lock bolt; so that when said fences are thus disengaged, any one of a series of suitable main keys may be inserted and turned to sweep said main tumblers into coöperative adjustment with respect to that key, and into reëngagement with said fences, but in a correspondingly changed relation, to thereafter remain subject to operation by that particular main key, until the combination to which the tumblers have been thus adjustably set is again changed.

My invention includes the various novel features of construction and arrangement hereinafter more definitely specified.

In said drawings: Figure I is a front elevation of a lock conveniently embodying my invention, with its locking slide bolt in locked position.

Fig. II is a rear elevation of the lock shown in Fig. I with its locking slide bolt in locked position.

Fig. III is an elevation of the right hand end of said lock as shown in Fig. I, which is the left hand end of said lock as shown in Fig. II.

Fig. IV is a front elevation of said lock shown in Figs. I to III inclusive, with its mechanism in the same locked position, but with the front cover plate removed to show the relative position of the elements of said mechanism which are normally concealed by said plate.

Fig. V is a front elevation of said lock, similar to Fig. IV, but showing the rotary key hub turned one quarter revolution clock-wise; which is the full extent of its movement by the guard key, preliminary to the unlocking movement of said slide bolt, by the main key for which the mechanism has been adjusted. Said key hub is turned backward by the guard key to the position shown in Fig. IV, and said guard key withdrawn before the main key is inserted.

Fig. VI is a front elevation of said lock, similar to Figs. IV and V, but showing said rotary key hub returned to the same position as in Fig. V, but by the main key for which it has been adjusted; to shift said locking bolt to its normal unlocked position, which is shown in Fig. VI.

Fig. VII is a front elevation of said lock, similar to Fig. VI, but with the auxiliary lock unlocked to permit the combination to be changed. Such change is effected by turning said rotary key hub, clock-wise, one-half revolution, from its locked position shown in Fig. I, to abnormally retract said locking bolt and withdraw the pivoted main tumblers aforesaid to the position shown in Fig. VII, in which their sectoral series of gear teeth are disengaged from the sectoral series of gear teeth of the reciprocatory fences aforesaid.

Fig. VIII is a front elevation of said lock, similar to Fig. IV, but with the combination of said tumblers changed by inserting a different main key in said rotary hub while the latter is in the position shown in Fig. VII, and turning it, anticlockwise, to sweep said main tumblers into coöperative adjustment with respect to that key, and re-engage them with said fences, in the position shown in Fig. VIII; which is different from that shown in Figs. IV to VI inclusive. Fig. VIII also shows the auxiliary lock in its normal locked position, as in Figs. I and IV to VI inclusive; so that Fig. VIII differs from Fig. IV only as to the position of said main tumblers.

Fig. IX is a vertical sectional view of said lock, taken on the line IX, IX in Figs. I and IV.

Fig. X is a vertical sectional view of said lock, taken on the line X, X in Figs. I and IV.

Fig. XI is a plan sectional view of said lock, taken on the line XI, XI in Figs. I and IV.

Fig. XII is a plan sectional view taken on the line XII, XII in Fig. VII.

Fig. XIII is a side elevation of the guard key of said lock.

Fig. XIV is an elevation of the main key to which said lock mechanism is adjusted when said main tumblers are in the position shown in Figs. IV to VI inclusive.

Fig. XV is an elevation of the different main key to which said lock mechanism is adjusted when the main tumblers are in the position shown in Fig. VIII.

Fig. XVI is an elevation of the auxiliary key, for the auxiliary lock which controls the combination changing mechanism.

Fig. XVII is a front elevation of the locking bolt.

Fig. XVIII is a front elevation of the change plate.

Fig. XIX is a front elevation of one of the partition plates, which separate the fences and main tumblers.

Fig. XX is a front elevation of the partition bar which separates the locking bolt from the group of fences.

In said figures: 1 is the locking bolt which is fitted to slide in the lock casing 2 having the cover 3 removably secured by the screws 4 in threaded engagement with the sockets 5 in said casing. Said bolt 1 slides on the bearing 6 which extends through the slot 7 in said bolt, and is carried by the change plate 8, which is fitted to slide in said casing 2, and has the abutment projection 9 adapted to normally abut against the auxiliary lock bolt 11 of the auxiliary lock 12, as indicated in Figs. I and IV; which prevents unauthorized change of the lock mechanism as aforesaid. The reciprocatory movement of said change plate 8 is limited by the extent of its notch 14, the opposite walls of which alternately contact with the inwardly extending projection 15 on said casing 2, shown at the upper edge of Fig. IV; and it is guided by the casing studs 16.

The outward locking movement of said lock bolt 1 is limited by said bearing 6 which is encountered by the right hand end of said slot 7, in the position shown in Figs. I, II, IV, V, VIII and XI; and the inward unlocking movement thereof is normally limited by the left hand end of said slot 7 encountering said bearing 6 while the latter is held stationary by said auxiliary lock bolt 11.

Said locking bolt 1 carries the stump 17 fitted to enter the gatings 18 of the fences 19 which are loosely supported for vertical reciprocation upon the stationary studs 20, which are rigidly connected with said casing 2 and extend in the slots 21 of said fences. In the form of my invention shown; there are four of said fences 19, which are all of the same shape, each having a sectoral series of gear teeth 23 adapted to changeably engage the sectoral series of gear teeth 24 upon respective tumblers 26, which are all of the same shape, pivoted upon said bearing 6.

In order to prevent the interference of any of said fences or tumblers with adjoining fences or tumblers, I prefer to separate them by the partition plates 27, of which there are three in the form of my invention shown. Moreover, I prefer to interpose the partition bar 28 between said locking bolt 1 and the group of fences 19 to prevent interference between them and to facilitate the removal of said fences when desired. Said partition bar has holes 29 loosely fitted to the stationary studs 20 aforesaid, and also has the notch 30 registering with said stump 17.

Said tumblers 26 are provided with respective springs 31, having their free ends bearing upon said casing member 15, and tending to thrust said tumblers downwardly, to the position shown in Fig. VII, when they are released from engagement with said fences. When in that position, the key sweep edges 32 of said tumblers 26 bear upon the rotary key hub 34, which is journaled in said casing 2 and cover 3 as shown in Fig. XI. Said key hub 34 is provided with the cam 35, which turns in the recess 36 of said locking bolt 1 so as to shift the latter, back and forth, when said hub is turned. That is to say; said hub 34 may be turned to shift said locking bolt 1 normally, back and forth, from the locked position shown in Fig. IV to the unlocked position shown in Fig. VI, while the change plate 8 aforesaid is held in stationary position by the auxiliary lock bolt 11; and, may be turned to the abnormal unlocked position shown in Fig. VII, when said change plate is released for rearward movement by retraction of said auxiliary lock bolt as shown in Fig. VII. In such abnormal movement; the left hand end of said slot 7 in the locking bolt 1 thrusts against said bearing 6 carried by the change plate 8 and thereby shifts the latter when said hub 34 is turned to the abnormal extent shown in Fig. VII in which said cam 35 bears upon the rear edge of the recess 36 in said locking bolt 1.

Said hub has two key ways 37 and 38 which are conveniently formed in diametrical alinement, as shown in Fig. I, and when in registry with the respective notches 39 and 40 in the hub bearing 41 on said cover 3, said key way 37 is adapted to receive the guard key 42 shown in Fig. XIII, and said key way 38 is adapted to receive main keys such as the keys 43 and 44 respectively shown in Figs. XIV and XV.

Of course, said locking bolt 1 cannot be shifted as above contemplated unless the main key inserted in the key hole 38 of said hub 34 is bitted so as to sweep said tumblers 26, and the fences 19 connected therewith, into such position as to hold all of said fences 19 with their gatings 18 in registry with said stump 17. Moreover, the guard lever 45, which is fulcrumed on the stud 46, which is in rigid relation with said casing 2, is provided with a spring 47 having its free end bearing upon the inwardly extending projection 48 of said casing so as to normally press the detent arm 49 of said lever in engagement with the shoulder 50 on said locking bolt, to detain the latter in the locked position shown in Figs. I and IV, and means must be employed to release said guard lever by manipulation of said guard key 42, as follows:

Said guard lever 46, has the stump 52 adapted to enter the gatings 53 of the guard tumblers 54 which are pivoted on the stationary stud 56 which is in rigid relation with said casing, and are provided with respective springs 57 bearing at their free ends upon said casing projection 48 and tending to turn said tumblers upwardly into the position shown in Fig. IV, in which position said tumblers are stopped by their projections 59 encountering said stump 52. Said guard lever 46 has the arm 60 carrying the stud 61 which is adapted to be encountered by the releasing tumbler 62 which is also pivoted on said stationary stud 56 and provided with the spring 63 having its free end bearing upon said casing projection 48 and tending to turn said releasing tumbler into the position shown in Fig. IV. It may be observed that when said guard lever 45 is turned to the position shown in Fig. V, its stud 61 is in position to be encountered by said releasing tumbler; so that said guard lever 45 may be released and restored to its normal position, shown in Fig. IV, by downward movement of said releasing tumbler 62, when the latter is swept downwardly by said guard key 42, turning said rotary hub 34.

Said guard key 42 and main key 43 are used to manipulate said lock, as follows:

The lock mechanism being in the position shown in Figs. I and IV; said guard key 42 is inserted in the key way 37 in the hub 34 and the latter turned, clock-wise, approximately 90°; the shape of said recess 36 in said locking bolt 1, being such as to permit such movement of the cam 35, without shifting said bolt 1. Said key 42 is bitted so as to sweep said tumblers 54 into position to receive said stump 52 in their gatings 53 and to then turn said guard lever 46 into the position shown in Fig. V, by the projecting bit 65 of said guard key 42, bearing upon the shoulder 66 of said guard lever. Thereupon, said hub 34 being returned to its normal position shown in Figs. I and IV, and said guard key 42 being withdrawn, the lock is in condition to be operated to retract the locking bolt 1 by the main key 43 shown in Fig. XIV. Said main key 43 being then inserted in the key way 38 of said hub 34, the latter is turned, clock-wise, from the normal locked position shown in Fig. IV to the normal unlocked position shown in Fig. VI. Said key 43 is bitted so as to sweep said tumblers 26 and their respective fences 19 into position to receive said stump 17 in the gatings 18 of said fences, thus permitting said cam 35, turning in said recess 36, to thrust said locking bolt 1 rearwardly to said unlocked position.

Reverse movement of said main key 43, effecting anticlock-wise turning movement of said hub 34, suffices to return said locking bolt 1 to the locked position shown in Figs. I and IV, without any other manipulation of the lock mechanism.

However, when it is desired to change the lock mechanism to be operative by means of another main key; the auxiliary lock bolt 11 may be retracted by inserting the lock key 68, shown in Fig. XVI, in the auxiliary lock key way 69, shown in Fig. III, and turning the same clock-wise 210° and, thereupon, said guard key 42 and main key 43 may be manipulated as above described, to shift the unlocking bolt to the normal unlocked position shown in Fig. VI but, by continuing the turning movement of the key 43, clock-wise, to the extent indicated in Fig. VII, the left hand end of the slot 7 in the locking bolt 1, encountering the bearing 6 of the change plate 8 thrusts the latter to the position shown in Fig. VII, thus disengaging the entire group of main tumblers 26 from their respective fences 19, because said tumblers are pivoted upon said bearing 6 and carried with it. When the teeth 24 of said main tumblers 26 are thus disengaged from the teeth 23 of said fences 19, said tumblers are thrust downwardly, by their respective springs 31, into the position shown in Fig. VII, in which the key sweep edges 32 of said tumblers 26 bear upon the rotary key hub 34. Thereupon; said main key 43 is further turned, clock-wise, until the keyway 38, in which it extends in said hub 34, registers with the notch 39 in the hub bearing 41, whereupon, said key 43 is withdrawn and the main key to which it is desired to adjust the lock mechanism is inserted in said key way 38, while the latter remains in the abnormal position last above described. For instance, the different main key 44, shown in Fig. XV, may be thus inserted and turned anticlockwise to first sweep said main tumblers 26 upwardly into coöperative relation with the bits of said main key 44 and then carry them to the left, until the teeth 24 of said tumblers 26 are reengaged with the teeth 23 of said fences 19, but in the different position shown in Fig. VIII. Such reëngaging movement of said tumblers 26 is effected by said cam 35 on said key hub 34 thrusting against the left hand side of the recess 36 in said locking bolt 1 until the latter is restored to the locked position shown in Fig. IV, and as in Fig. VIII; for, during the latter portion of that locking movement, the right hand end of said slot 7 in said locking bolt 1 encounters said bearing 6 of the change plate 8, and carries the latter to the left, shifting it from the abnormal position shown in Fig. VII to the normal position shown in Figs. IV and VIII. Thereupon, the auxiliary lock bolt 11 may be restored to its normal locked position shown in Fig. IV, and as shown in Fig. VIII, by reverse movement of said auxiliary lock key 68 aforesaid; which key may then be withdrawn; leaving the lock in the same position as it was in Fig. IV, when it was adjusted to coöperate with the main key 43, except that the main tumblers 26 have been differently adjusted to coöperate with said different main key 44.

It is to be understood that, in the manner last described, said lock mechanism may be adjustably changed to coöperate with any one of a numerous series of different main keys, said keys differing from each other only in the arrangement of their bittings which coöperate with the main tumblers 26.

It is to be understood that said lock is secured with its front face against the inner face of a door, or drawer front, by screws extending through the holes 71 in said casing 2; so that the front of the lock is only accessible when the lock is bodily removed from its normal position. Therefore, I find it convenient to make the auxiliary lock 12 separable from said lock casing 2 and mount it therein by engagement of its flanges 72 in the undercut, dove-tailed, recess 73 in said casing 2. Said flanges 72 are conveniently formed as extensions upon the pressed sheet metal casing of said lock 12 and of such dimensions as to resiliently engage the opposite angular faces of said recess 73, so that no other securing means is required to prevent accidental separation of said auxiliary lock from the main lock.

It is to be understood that I do not desire to limit myself to the precise details of construction and arrangement herein set forth, as it is obvious that various modifications may be made therein, without departing from the essential features of my invention, as defined in the appended claims.

I claim:

1. In a changeable combination key lock, the combination with a casing; of a locking bolt, having a stump; a rotary key hub with two separate keyways, respectively for a guard key and a main key; main tumbler mechanism arranged to detain and release said bolt in accordance with the position thereof, including a series of counterpart pivoted main tumblers, each having a sectoral series of gear teeth at its free end and each adjustable, at its free end, to change the combination; reciprocatory fences having respective sectoral series of gear teeth arranged to mesh with the gear teeth on the respective tumblers; each of said fences having a gating adapted to receive said locking bolt stump; a change plate carrying said tumblers and having a projection in position to be encountered by said locking bolt when the latter is withdrawn so as to disengage said tumblers from the gear teeth of said fences and permit said tumblers to be changed; guard tumbler mechanism arranged to detain and release said bolt in accordance with the position thereof, including a guard lever having a detent arm arranged to detachably engage said locking bolt, and having a portion adapted to be encountered by a guard key to disengage said detent arm from said locking bolt, and a series of pivoted guard tumblers arranged to hold and release said guard lever in accordance with the position thereof; an auxiliary key lock having a movable bolt adapted to normally prevent movement of said locking bolt to the extent necessary to disengage said main tumblers from said fences; said auxiliary lock bolt being movable by an auxiliary key to release said locking bolt to permit the combination to be changed; whereby, a guard key and a main key are required to be successively inserted in the respective keyways in said key hub to turn the latter to open the lock; said main tumblers are pivotally adjustable with respect to said change plate, to change the lock to be operated by different main keys, while subject to operation by the same guard key; by manipulation of said auxiliary lock and without disassembling the lock mechanism or opening said casing.

2. In a changeable combination key lock, the combination with a casing; of a locking bolt; a rotary key hub arranged to coöperate with a guard key and a main key; main tumbler mechanism arranged to detain and release said bolt in accordance with the position thereof, including a series of pivoted main tumblers, each having a sectoral series of gear teeth at its free end and each adjustable to change the combination; fences having respective series of gear teeth arranged to mesh with the gear teeth on the respective tumblers; a change plate carrying said tumblers and arranged to be encountered by said locking bolt when the latter is withdrawn so as to disengage said main tumblers from the gear teeth of said fences and permit said tumblers to be changed; guard tumbler mechanism arranged to detain and release said bolt in accordance with the position thereof, including a guard lever arranged to detachably engage said locking bolt, and to be moved by a guard key to disengage it from said locking bolt, and a series of pivoted guard tumblers arranged to hold and release said guard lever in accordance with the position thereof; an auxiliary key lock adapted to normally prevent movement of said locking bolt to the extent necessary to disengage said main tumblers from said main fences; said auxiliary lock being operable by an auxiliary key to release said locking bolt to permit the combination to be changed; whereby, a guard key and a main key are required to be successively inserted in the respective keyways in said key hub to turn the latter to open the lock; and said main tumblers are adjustable to change the lock to be operated by different main keys, while subject to operation by the same guard key; by manipulation of said auxiliary lock and without disassembling the lock mechanism or opening said casing.

3. In a changeable combination key lock, the combination with a casing; of a locking bolt; a rotary key hub arranged to coöperate with a guard key and a main key; mechanism arranged to detain and release said bolt in accordance with the position thereof, including a series of tumblers, each having a series of teeth and each adjustable to change the combination; fences having respective series of teeth arranged to mesh with the teeth on the respective tumblers; a change plate carrying said tumblers and arranged to be encountered by said locking bolt when the latter is withdrawn so as to disengage said tumblers from the teeth of said fences and permit said tumblers to be changed; guard mechanism arranged to detain and release said bolt in accordance with the position thereof, including a guard lever arranged to detachably engage said locking bolt, and to be moved by a guard key to disengage it from said locking bolt; an auxiliary lock adapted to normally prevent movement of said locking bolt to the extent necessary to disengage said tumblers from said fences; said auxiliary lock being operable to release said locking bolt to permit the combination to be changed; whereby, a guard key and a main key are required to be successively used with said key hub to turn the latter to open the lock; and said main tumblers are adjustable to change the lock to be operated by different main keys, while subject to operation by the same guard key; by manipulation of said auxiliary lock and without disassembling the lock mechanism or opening said casing.

4. In a changeable combination key lock, the combination with a casing; of a locking bolt; a rotary key hub arranged to coöperate with a guard key and a main key; mechanism arranged to detain and release said bolt, including a series of tumblers, each having a series of teeth and each adjustable to change the combination; fences having respective series of teeth arranged to mesh with the teeth on the respective tumblers; a change plate carrying said tumblers and arranged to be moved by said locking bolt when the latter is withdrawn so as to disengage said tumblers from said fences and permit said tumblers to be changed; guard mechanism arranged to detain and release said bolt in accordance with the position thereof, including a guard lever arranged to be moved by a guard key; an auxiliary lock adapted to normally prevent movement of said locking bolt to the extent necessary to disengage said tumblers from said fences; said auxiliary lock being operable by an auxiliary key to release said locking bolt to permit the combination to be changed; whereby, a guard key and a main key are required to be successively used with said key hub to turn the latter to open the lock; and said tumblers are adjustable to change the lock to be operated by different main keys, while subject to operation by the same guard key, by manipulation of said auxiliary lock and without disassembling the lock mechanism or opening said casing.

5. In a changeable combination key lock, the combination with a casing; of a locking bolt; a rotary key hub arranged to cooperate with a guard key and a main key; mechanism arranged to detain and release said bolt in accordance with the position thereof, including a series of tumblers, each having a series of teeth and each adjustable to change the combination; fences having respective series of teeth arranged to mesh with the teeth on the respective tumblers; a change plate carrying said tumblers and arranged to be moved by said locking bolt when the latter is withdrawn so as to disengage said tumblers from said fences and permit said tumblers to be changed; guard mechanism arranged to detain and release said bolt in accordance with the position thereof, and to be moved by a guard key; an auxiliary lock adapted to normally prevent movement of said locking bolt to the extent necessary to disengage said tumblers from said fences; said auxiliary lock being operable to release said locking bolt to permit the combination to be changed; whereby, a guard key and a main key are required to turn said key hub to open the lock; and said tumblers are adjustable to change the lock to be operated by different main keys, while subject to operation by the same guard key, by manipulation of said auxiliary lock and without disassembling the lock mechanism or opening said casing.

6. In a changeable combination key lock, the combination with a casing; of a locking bolt, having a stump; a rotary key hub with two separate keyways, respectively for a guard key and a main key; tumbler mechanism arranged to detain and release said bolt in accordance with the position thereof, including a series of counterpart pivoted tumblers, each having a sectoral series of teeth at its free end and each adjustable, at its free end, to change the combination; reciprocatory fences having respective sectoral series of teeth arranged to mesh with the gear teeth on the respective tumblers; each of said fences having a gating adapted to receive said locking bolt stump; a change plate carrying said tumblers and having a projection in position to be encountered by said locking bolt when the latter is withdrawn so as to disengage said tumblers from the teeth of said fences and permit said tumblers to be changed; and guard mechanism arranged to detain and release said bolt in accordance with the position thereof, arranged to be operated by a guard key to release said locking bolt; whereby, a guard key and a main key are required to be successively inserted in the respective keyways in said key hub to turn the latter to open the lock; and said tumblers are adjustable to change the lock to be operated by different main keys, while subject to operation by the same guard key.

7. In a changeable combination key lock, the combination with a casing; of a locking bolt; a rotary key hub arranged to cooperate with a guard key and a main key; tumbler mechanism arranged to detain and release said bolt in accordance with the position thereof, including a series of pivoted tumblers, each having a series of teeth at its free end and each adjustable, at its free end, to change the combination; fences having respective series of teeth arranged to mesh with the teeth on the respective tumblers; a change plate carrying said tumblers and arranged to be moved by said locking bolt when the latter is withdrawn so as to disengage said tumblers from the teeth of said fences and permit said tumblers to be changed; and guard mechanism arranged to detain and release said bolt in accordance with the position thereof, arranged to be operated by a guard key to disengage said locking bolt; whereby, a guard key and a main key are required to be successively used with said key hub to turn the latter to open the lock; and said tumblers are adjustable to change the lock to be operated by different main keys, while subject to operation by the same guard key.

8. In a changeable combination key lock, the combination with a casing; of a locking bolt; a rotary key hub; tumbler mechanism arranged to detain and release said bolt in accordance with the position thereof, including a series of pivoted tumblers, each having a series of teeth at its free end and each adjustable, at its free end, to change the combination; fences having respective series of teeth arranged to mesh with the teeth on the respective tumblers; a change plate carrying said tumblers and arranged to be moved by said locking bolt when the latter is withdrawn so as to disengage said tumblers from the teeth of said fences and permit said tumblers to be changed; and guard mechanism arranged to detain and release said bolt in accordance with the position thereof, arranged to be operated by a guard key to disengage said locking bolt.

9. In a changeable combination key lock, the combination with a casing; of a locking bolt, having a stump; a rotary key hub; tumbler mechanism arranged to detain and release said bolt in accordance with the position thereof, including a series of pivoted tumblers, each having a series of teeth at its free end and each adjustable, at its free end, to change the combination; reciprocatory fences having respective series of teeth arranged to mesh with the teeth on the respective tumblers; each of said fences having a gating adapted to receive said locking bolt stump; a change plate carrying said tumblers and arranged to be moved by said locking bolt when the latter is withdrawn so as to disengage said tumblers from the teeth of said fences and permit said tumblers to be changed; and guard mechanism arranged to detain and release said bolt in accordance with the position thereof, arranged to be operated by a guard key to disengage said locking bolt.

10. In a changeable combination key lock, the combination with a casing; of a locking bolt, having a stump; a rotary key hub; tumbler mechanism arranged to detain and release said bolt in accordance with the position thereof, including a series of pivoted tumblers. each having a series of teeth at its free end and each adjustable, at its free end, to change the combination; fences having respective series of teeth arranged to mesh with the teeth on the respective tumblers; each of said fences having a gating adapted to receive said locking bolt stump; a change plate carrying said tumblers and arranged to be moved by said locking bolt when the latter is withdrawn so as to disengage said tumblers from the teeth of said fences and permit said tumblers to be changed; and guard mechanism arranged to detain and release said bolt in accordance with the position thereof, arranged to be operated by a guard key to disengage said locking bolt.

11. In a changeable combination key lock, the combination with a casing; of a locking bolt; a rotary key hub: tumbler mechanism arranged to detain and release said bolt in accordance with the position thereof, including a series of pivoted tumblers, each having a series of teeth at its free end and each adjustable, at its free end, to change the combination; reciprocatory fences having respective series of teeth arranged to mesh with the teeth on the respective tumblers; a change plate carrying said tumblers and arranged to be moved by said locking bolt when the latter is withdrawn so as to disengage said tumblers from the teeth of said fences and permit said tumblers to be changed; and guard mechanism arranged to detain and release said bolt in accordance with the position thereof, arranged to be operated by a guard key to disengage said locking bolt.

12. In a changeable combination key lock, the combination with a casing; of a locking bolt, having a stump; a rotary key hub; tumbler mechanism arranged to detain and release said bolt in accordance with the position thereof, including a series of pivoted tumblers, each having fence engaging means at its free end and each adjustable, at its free end, to change the combination; reciprocatory fences having means arranged to engage said tumblers; each of said fences having a gating adapted to receive said locking bolt stump; means, on said casing, supporting said fences independently of said locking bolt; a change plate carrying said tumblers and arranged to be moved by said locking bolt when the latter is withdrawn so as to disengage said tumblers from said fences and permit said tumblers to be changed; and guard mechanism arranged to detain and release said bolt in accordance with the position thereof, arranged to be operated by a guard key to disengage said bolt.

13. In a changeable combination key lock, the combination with a casing; of a locking bolt, having a stump; a rotary key hub; tumbler mechanism arranged to detain and release said bolt in accordance with the position thereof, including a series of pivoted tumblers, each having fence engaging means at its free end and each adjustable, at its free end, to change the combination; reciprocatory fences having means arranged to engage said tumblers; each of said fences having a gating adapted to receive said locking bolt stump; means supporting said fences, independently of said locking bolt, for movement transversely to said bolt; a change plate carrying said tumblers and arranged to be moved by said locking bolt when the latter is withdrawn so as to disengage said tumblers from said fences and permit said tumblers to be changed; and guard mechanism arranged to detain and release said bolt in accordance with the position thereof, arranged to be operated by a guard key to disengage said bolt.

14. In a changeable combination key lock, the combination with a casing; of a locking bolt, having a stump; a rotary key hub; tumbler mechanism arranged to detain and release said bolt in accordance with the position thereof, including a series of pivoted tumblers, each having fence engaging means at its free end and each adjustable, at its free end, to change the combination; reciprocatory fences having means arranged to engage said tumblers; each of said fences having a gating adapted to receive said locking bolt stump; means supporting said fences independently of said locking bolt; a change plate carrying said tumblers and arranged to be moved by said locking bolt when the latter is withdrawn so as to disengage said tumblers from said fences and permit said tumblers to be changed; and guard mechanism arranged to detain and release said bolt in accordance with the position thereof.

15. In a changeable combination key lock, the combination with a casing; of a locking bolt, having a stump; a rotary key hub; tumbler mechanism arranged to detain and release said bolt in accordance with the position thereof, including a series of pivoted tumblers, each having fence engaging means at its free end and each adjustable, at its free end, to change the combination; reciprocatory fences having means arranged to engage said tumblers; each of said fences having a gating adapted to receive said locking bolt stump; means supporting said fences independently of said locking bolt; a change plate carrying said tumblers and arranged to be moved by said locking bolt when the latter is withdrawn so as to disengage said tumblers from said fences and permit said tumblers to be changed.

16. In a changeable combination key lock, the combination with a casing; of a locking bolt; a rotary key hub; tumbler mechanism arranged to detain and release said bolt in accordance with the position thereof, including a series of pivoted tumblers, each having fence engaging means at its free end and each adjustable, at its free end, to change the combination; reciprocatory fences having means arranged to engage said tumblers; means supporting said fences, independently of said locking bolt, for movement transversely to said bolt; a change plate carrying said tumblers and arranged to be moved by said locking bolt when the latter is withdrawn so as to disengage said tumblers from said fences and permit said tumblers to be changed; and guard mechanism arranged to detain and release said bolt in accordance with the position thereof, arranged to be operated by a guard key to disengage said bolt.

17. In a changeable combination key lock, the combination with a casing; of a locking bolt; a rotary key hub; tumbler mechanism arranged to detain and release said bolt in accordance with the position thereof, including a series of pivoted tumblers, each having fence engaging means at its free end and each adjustable, at its free end, to change the combination; reciprocatory fences having means arranged to engage said tumblers; means supporting said fences independently of said locking bolt; a change plate carrying said tumblers and arranged to be moved by said locking bolt when the latter is withdrawn so as to disengage said tumblers from said fences and permit said tumblers to be changed; and guard mechanism arranged to detain and release said bolt in accordance with the position thereof.

18. In a changeable combination key lock, the combination with a casing; of a locking bolt; a rotary key hub; tumbler mechanism arranged to detain and release said bolt in accordance with the position thereof, including a series of pivoted tumblers, each having fence engaging means at its free end and each adjustable, at its free end, to change the combination; reciprocatory fences having means arranged to engage said tumblers; and means supporting said fences independently of said locking bolt; a change plate carrying said tumblers and arranged to be moved by said locking bolt when the latter is withdrawn so as to disengage said tumblers from said fences and permit said tumblers to be changed.

19. In a changeable key lock, the combination with a casing, having an undercut dovetailed recess; of a locking bolt arranged to reciprocate in said casing and having a projection adapted to enter said recess when said bolt is abnormally retracted; an auxiliary key lock, separably mounted in said recess, and having means frictionally engaging the walls of said recess and preventing accidental separation of said locks; said auxiliary lock having a member arranged to prevent abnormal retraction of said locking bolt when said auxiliary lock is locked.

20. In a changeable lock, the combination with a casing, having an undercut dovetailed recess; of a locking bolt arranged to reciprocate in said casing and having a projection adapted to enter said recess when said bolt is abnormally retracted; an auxiliary lock, separably mounted in said recess, and having means frictionally engaging the walls of said recess and preventing accidental separation of said locks; said auxiliary lock having a member arranged to prevent abnormal retraction of said locking bolt when said auxiliary lock is locked.

21. In a changeable combination lock, the combination with a casing, having a recess; of a locking bolt arranged to reciprocate in said casing and having a projection adapted to enter said recess when said bolt is abnormally retracted; a rotary key hub, having a key way extending transversely to the direction of movement of said locking bolt; an auxiliary key lock, separably mounted in said recess, having a key way extending transversely to the key way of said main lock, and parallel with the direction of movement of said locking bolt; said auxiliary lock having a member arranged to prevent abnormal retraction of said locking bolt when said auxiliary lock is locked.

22. In a changeable combination lock, the combination with a reciprocatory locking bolt; of tumbler mechanism arranged to detain and release said bolt in accordance with the position thereof; a change element, movable to change the combination of said tumblers; an auxiliary lock normally preventing movement of said change element, and having a key way extending parallel with the direction of reciprocation of said bolt; and a key for said auxiliary lock arranged to release said change element when inserted in said key way, parallel with the direction of movement of said lock bolt.

In testimony whereof, I have hereunto set my hand this 28th day of April, 1919.

EDWARD WILLEY MARVEL.

Witnesses:
W. A. WATSON,
WM. A. STARK.